Patented Feb. 27, 1940

2,191,695

UNITED STATES PATENT OFFICE 2,191,695

PROCESS OF TREATING FRUIT

Josef J. Holzman, Los Angeles, Calif.

No Drawing. Application May 31, 1939,
Serial No. 276,557

5 Claims. (Cl. 99—154)

This invention relates to a process of treating fruit for the purpose of sterilizing the fruit to destroy insect life, such as the fruit fly or the melon fly.

In authorizing the entry of Hawaiian fruits into the mainland of the United States, one treatment authorized by the Department of Agriculture requires that the fruit be sterilized by a process in which the fruit is heated until the approximate center thereof reaches the temperature of 110° F., and the fruit be held at this temperature for a period of eight hours in an atmosphere of approximately 100% relative humidity. The same process of sterilizing fruit for insect destruction has been used in other areas, notably in the Florida citrus industry, for sterilizing fruit before the same is passed to market. Grapefruit, oranges, tangerines, satsumas, and avocados have been subjected to such sterilization and shipped to market. In the treatment of fruits other than grapefruit it has been found that in some instances the fruit will not completely tolerate the sterilization process and that injury can not be entirely avoided. Recent work in Hawaii, particularly in connection with the Solo papayas, has demonstrated that the sterilization process results in the fruit being injured in many cases. The injured fruit develops a cooked flavor and an unpleasant and disagreeable odor. Furthermore, the injured portions of the fruit are generally changed from a golden orange to a bright lemon yellow. Several days after treatment, the injury in some cases has accentuated a blackening of the vascular bundles. Particularly with the riper fruit, the injured areas become soft and translucent. In less ripe fruit the injured portions do not ripen and remain as a hard shell about the fruit cavity.

It is the general object of the present invention to provide a process of sterilizing fruit from insect destruction, by which injury to the fruit will be avoided.

The present invention is predicated upon the discovery that by properly selecting and conditioning the fruit previous to the required sterilization treatment it is possible to thereafter subject the fruit to the required sterilization process without the injury to the fruit heretofore experienced.

In accordance with the process of the present invention, the fruit to be treated is first conditioned by treating the fruit at a reduced relative humidity, for example, 50 to 80%, to a temperature of about 90–110° F., for a suitable period of time, such as about eight hours. The humidity of the atmosphere surrounding the fruit during this treatment, the temperature of treatment, and the period of exposure may vary somewhat with the individual idiosyncrasy or the variety of the fruit or vegetable. By this process of initially conditioning the fruit, it is found that the fruit may thereafter be subjected to the prescribed sterilization treatment, i. e., heat treatment, at 110° F. for eight hours in a saturated atmosphere (100% humidity) without injury to the fruit. It appears that the tolerance of fruit to the sterilization process depends upon the water content of the fruit treated. Thus, for example, I have found that papayas harvested in Hawaii during a period of little rainfall and low humidity may without any previous conditioning be subjected to the prescribed sterilization treatment and shipped to market without injury. Fruits so harvested in periods of comparatively low humidity and little rainfall have been subjected to the required sterilization treatment and shipped to California, and found to be in excellent condition as regards their appearance, flavor, and soundness. Fruit harvested during periods of heavy rainfall and high humidity and subjected to the prescribed sterilization treatment, when similarly shipped, were found to be injured; some very seriously.

It appears that the process of heating fruit, such as papayas, at a high temperature, such for example as 110° F., causes the fruit to undergo certain changes, resulting in the liberation from the fruit of metabolic water. Providing the water content of the fruit is sufficiently low so that this metabolic water may be absorbed into the cells of the fruit, or providing that the atmosphere surrounding the fruit is sufficiently low in humidity, this release of water from the fruit will not result in injury to the fruit. Where, however, the fruit has a high water content and is subjected to such high temperature treatment in an atmosphere of high humidity, injury to the fruit follows. To insure adequate sterilization of the fruit from insects, such as the fruit fly or the melon fly, it appears necessary that the fruit be surrounded during the sterilizing treatment with an atmosphere of substantially 100% humidity. If the water content of the fruit is high, the fruit can not be heated to the high sterilizing temperature in the presence of such a highly humid atmosphere without damage to the fruit. By the process of the present invention, the fruit is, therefore, given a preliminary heat treatment in an atmosphere of reduced humidity. This preliminary treatment of the fruit results in the loss of a part of the water content of the fruit, and, furthermore, causes the fruit to give off part of its metabolic water in an atmosphere of low humidity. It is then possible to subsequently heat the fruit in the presence of a highly humid atmosphere to effect the desired sterilization without injury to the fruit.

The present invention, together with various objects and advantages of the same, will best be understood from a description of the preferred form or example of the process of treating fruit embodying the invention. While the invention has been and can be successfully applied to a great variety of fruit, including tomatoes, egg plant, beans, cucumbers, bell peppers, avocados, as well as citrus fruits, satsumas, etc. I have found the process to be well adapted for the treatment of the Solo papaya, and will, therefore, describe the preferred example of the invention in connection with the treatment of such fruit.

In the treatment of the fruit, an important feature is the maturity of the fruit. While the ripening process in the papaya is a continuous one and once it begins there are no definite stages of ripeness, for practical purposes its maturity is divided into three stages: (a) mature-green, (b) firm-ripe, and (c) ripe. Mature-green fruit are those fruit in which the dark-green color is beginning to fade and there is a slight blush of yellow near the blossom end. Firm-ripe includes all fruit which range from mature-green to about one-third full yellow. Ripe fruit may be classified as all fruit riper than firm-ripe. These color standards vary somewhat with the location and with the season of the year, so that it is necessary in most instances to cut a few fruit to determine the correlation of the color with the maturity.

The process of the present invention may be applied to fruit of all degrees of maturity, although it is recommended that the fruit be either mature-green or firm-ripe. The mature-green or firm-ripe fruit when processed in accordance with the present invention will in most instances be totally uninjured, whereas a substantial portion of the ripe fruit will be injured, although the percentage of the fruit injured by the present process will be markedly decreased. All of the fruit to be marketed may be processed in accordance with the process of the present invention, although in certain cases where the fruit has been harvested in dry seasons the present process may be unnecessary; however, even in the case of such fruit an improvement in the keeping properties may be effected by the process. All fruit which has a water content above about 89% should be conditioned before sterilization.

While the conditioning treatment of the present invention may be subjected to considerable variation, the preferred treatment consists in heating the fruit until the temperature of the approximate center thereof reaches 110° F. in an atmosphere of about 50-55% humidity, after which the fruit should be held at such temperature for eight hours. Obviously, variations may be made in the process depending upon the water content of the fruit, its ripeness, etc. Under some circumstances humidities of nearly 80% may be employed. Under other circumstances, humidities as low as 45-50% should be employed. The duration of treatment may be less or longer than the preferred time stated. Furthermore, the temperature may, in certain cases, be reduced, particularly in a part of the treatment. For example, I have successfully treated fruit by subjecting it to a temperature of 100° F. in an atmosphere of 60% relative humidity for a period of six hours, followed by raising the temperature to 110° F., and continuing the treatment for a period of two hours at 110° F. Subsequent to the preliminary conditioning of the fruit, the fruit should then be given the sterilization treatment for the destruction of insects or fruit flies, such treatment consisting of heating the fruit after the center of the fruit reaches 110° F. for a period of approximately eight hours in a substantially 100% humid atmosphere.

To illustrate the process of the present invention, one lot of papayas was subjected to sterilization treatment at 100% relative humidity without any of the preconditioning of the present invention. All of this sample of fruit was found to be injured, including not only the ripe but the firm-ripe and mature-green fruit. A similar sample of the same fruit when treated at 100° F. and 60% relative humidity for six hours, plus a further treatment at 110° F., and 80% relative humidity for two hours, then sterilized at 110° F. in a 100% relative humidity for eight hours showed a marked improvement in the amount of fruit injured. Of the fruit so tested, all of the mature-green fruit was uninjured. Only 8.3% of the firm-ripe fruit was injured and 37.5% of the ripe fruit was injured. As a further example, another allotment of the same fruit was subjected to treatment at 100° F. and 60% relative humidity for six hours, plus a further treatment at 110° F. and 60% relative humidity for two hours, and then subjected to the sterilization treatment at 110° F. in a 100% relative humidity for eight hours. Of this fruit none of the mature-green or firm-ripe fruit was injured, and 25% only of the ripe fruit was injured.

Immediately subsequent to the sterilization treatment, the fruit should be removed from the sterilization chamber and arranged in such a manner that it may be aerated and allowed to cool as quickly as possible to an atmospheric temperature. The fruit should not be packed while it is still warm. The fruit may then be packed and shipped to market in any desired or preferred manner. By the process of the present invention not only is it possible to adequately sterilize the fruit from insect destruction without injury, but it is also found that fruit subjected to the process of the present invention will last from five to seven days longer than the untreated fruit.

While the specific process herein described is well adapted to carry out the objects of the present invention, it will be understood that various modifications and changes may be made and that fruit other than the Solo papaya can and have been similarly treated, and the process of the present invention includes all such variations and modifications as come within the scope of the appended claims.

I claim:

1. In a process of treating papayas for the sterilization of the same from insect infestation in which the sterilization is to be effected at a temperature of approximately 110° F. in an atmosphere of saturated humidity, the steps of preliminarily conditioning the fruit to withstand such treatment, which consists in heating the papayas to approximately the sterilization temperature in an atmosphere of 80% or less relative humidity.

2. In a process of treating papayas for the sterilization of the same from insect infestation in which the sterilization is to be effected at a temperature of approximately 110° F. in an atmosphere of saturated humidity, the steps of preliminarily conditioning the fruit to withstand such treatment, which consists in heating the papayas to approximately the sterilization temperature in an atmosphere of 60% or less relative humidity.

3. In a process of treating fruit for the sterilization of the same for insect infestation in which sterilization is to be effected at temperatures of approximately 110° F. in an atmosphere of saturated humidity, the steps of preliminarily conditioning the fruit to withstand such treatment which consists in heating the fruit to approximately the sterilization temperature in an atmosphere of 80% or less relative humidity.

4. In a process of treating fruit for the sterilization of the same for insect infestation in which the sterilization is to be effected at a temperature of approximately 110° F. in an atmosphere of saturated humidity, the steps of preliminarily conditioning the fruit to withstand such treatment, which consists in heating the fruit to approximately the sterilization temperature in an atmosphere of 60% or less relative humidity.

5. In a process of treating fruit containing over about 89% water for sterilization of the same from insect infestation in which the sterilization is to be effected at a temperature of approximately 110° F. in an atmosphere of saturated humidity, the steps of preliminarily conditioning the fruit to withstand such treatment, which consists in heating the fruit to approximately the sterilization temperature in an atmosphere of 60% or less relative humidity.

JOSEF J. HOLZMAN.